Sept. 16, 1969         A. J. GAUPIN                3,466,936
            CONTROLLING DEVICE OF THE ROTATION OF A
                SLOW-ROTATING DRUM LIKE ELEMENT
Filed Feb. 15, 1967                         7 Sheets-Sheet 3
Fig 5a
Fig 5
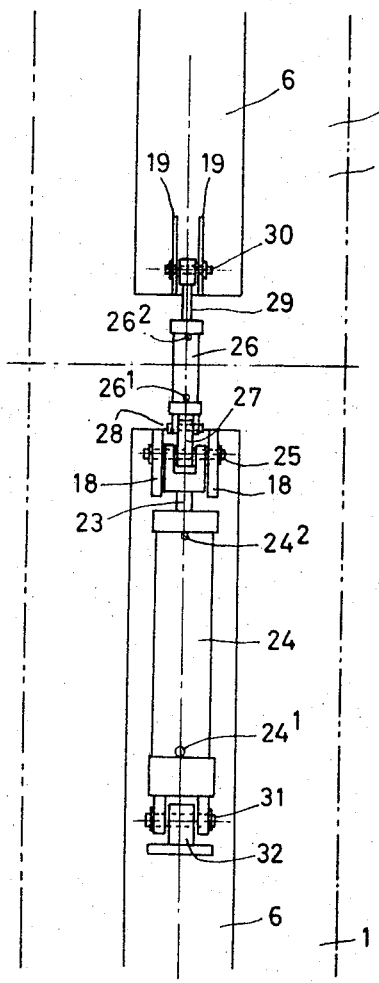
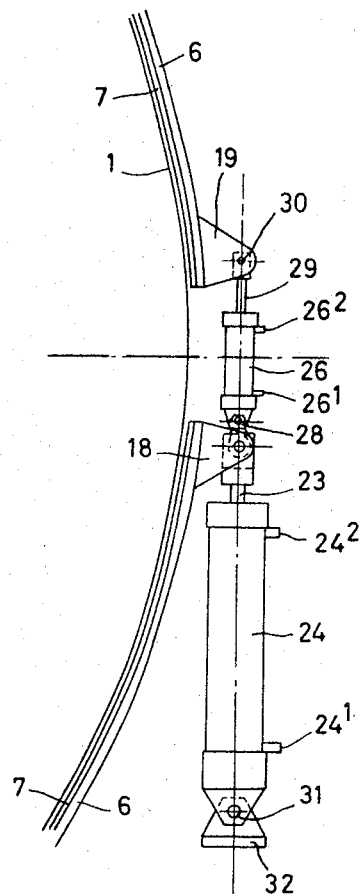
INVENTOR.
Arthur Jules Gaupin
BY
Sparrow and Sparrow
ATTORNEYS

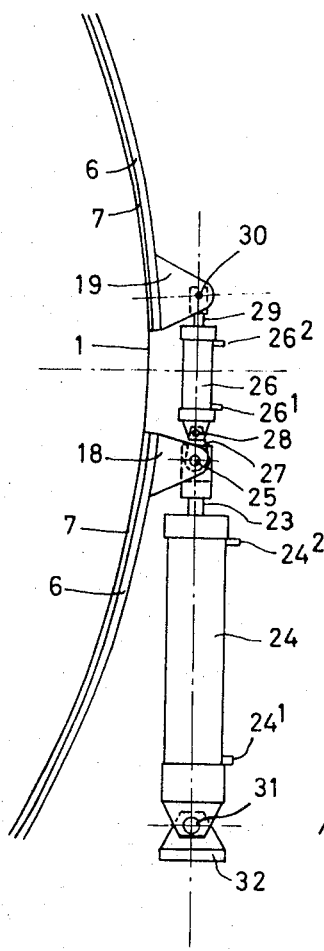
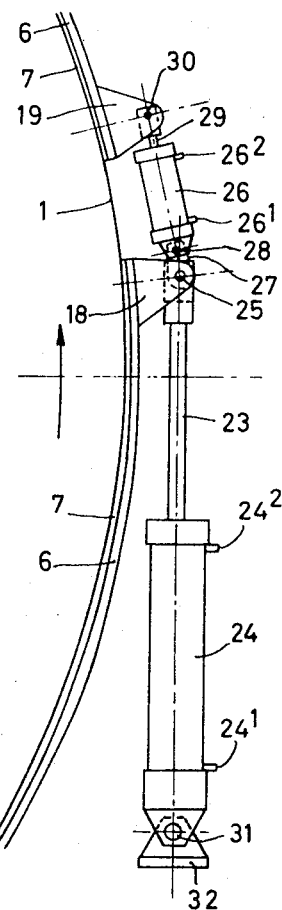
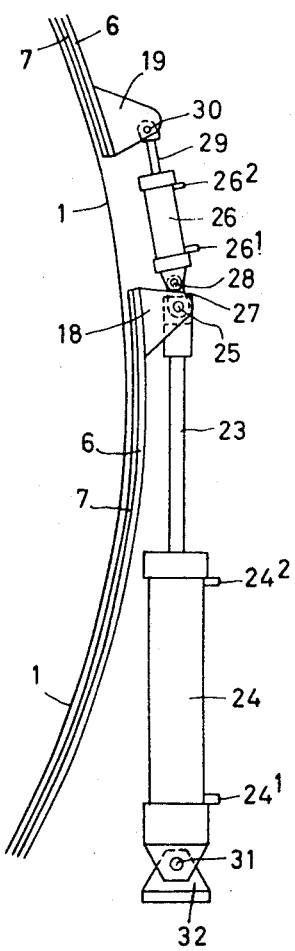

INVENTOR.
Arthur Jules Gaupin
BY
Sparrow and Sparrow

Sept. 16, 1969         A. J. GAUPIN              3,466,936
          CONTROLLING DEVICE OF THE ROTATION OF A
               SLOW-ROTATING DRUM LIKE ELEMENT
Filed Feb. 15, 1967                        7 Sheets-Sheet
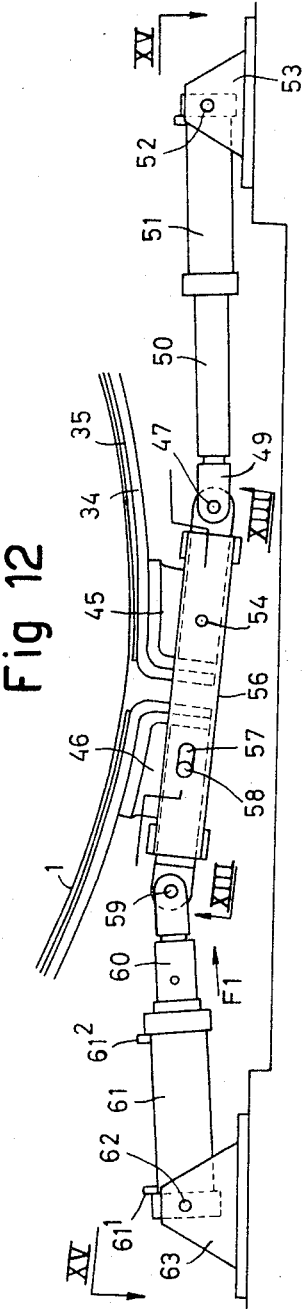
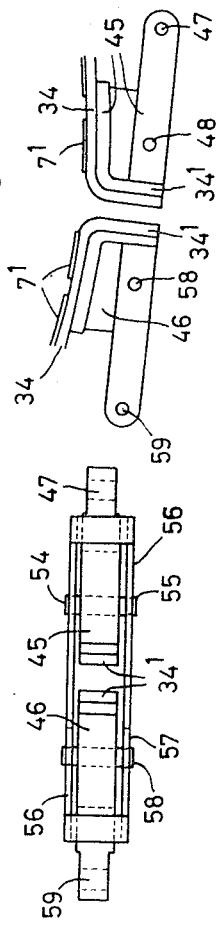
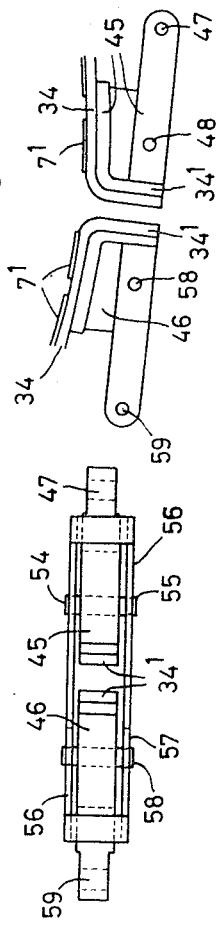
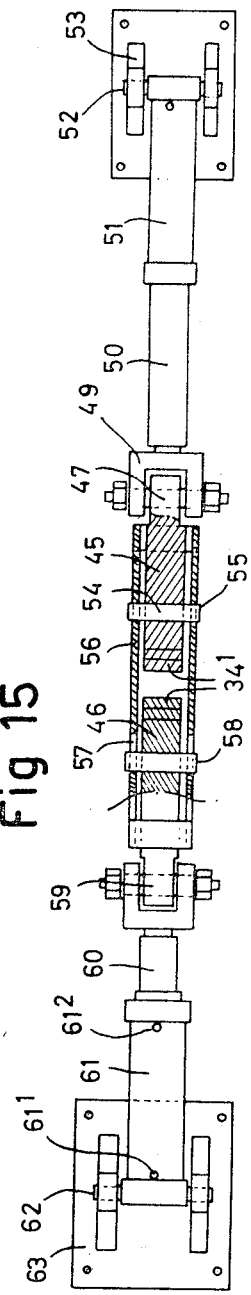
INVENTOR.
Arthur Jules Gaupin
BY
Sparrow and Sparrow
ATTORNEYS

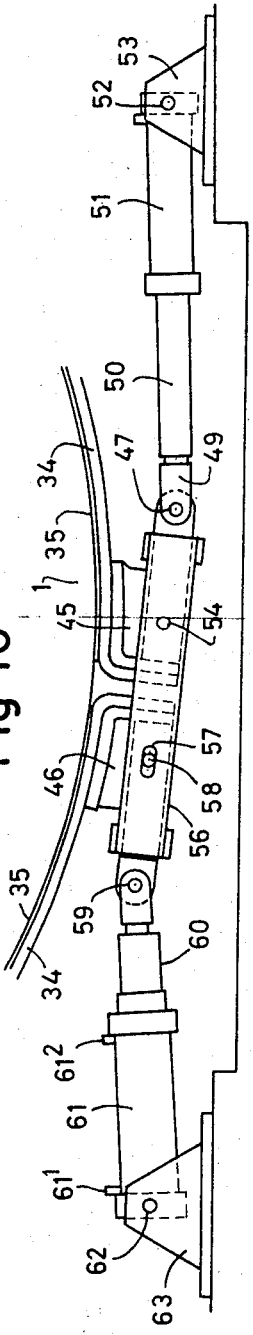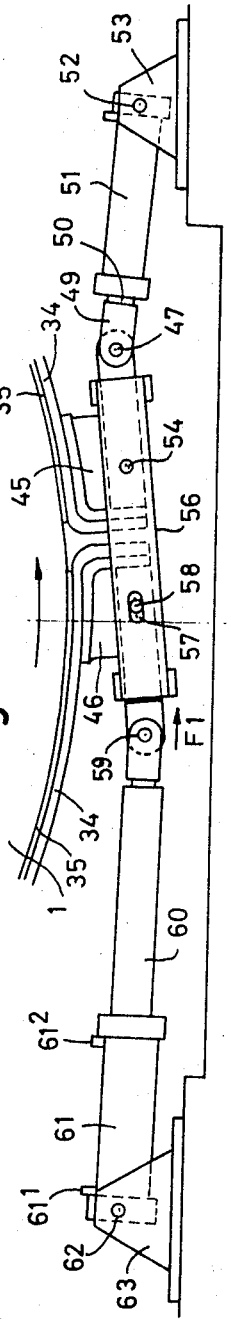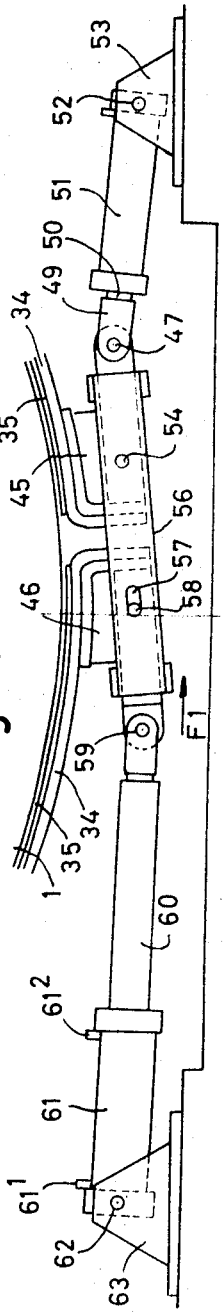

United States Patent Office 3,466,936
Patented Sept. 16, 1969

3,466,936
CONTROLLING DEVICE OF THE ROTATION OF A SLOW-ROTATING DRUM LIKE ELEMENT
Arthur Jules Gaupin, Brussels, Belgium, assignor to Ateliers Belges Reunis Societe Anonyme, Hainaut, Belgium
Filed Feb. 15, 1967, Ser. No. 616,383
Claims priority, application Belgium, Feb. 16, 1966, B 24,110, Patent 676,567
Int. Cl. F16h 27/00; F27b 7/26
U.S. Cl. 74—88                      13 Claims

ABSTRACT OF THE DISCLOSURE

A device for slowly rotatably moving a horizontal drum-like container. A metal strip lined with friction material, a fluid power operated gripping cylinder for tightening the strip around the drum and a fluid power operated driving cylinder articulatedly connected with the metal strip for applying a tangential force to the metal strip, thus rotating slowly the drum-like element.

My invention relates to a controlling device of rotation of a slowly rotating drum-like element for instance for continuous diffusion and cane grinding in sugar manufacture.

Slowly-moving apparatuses such as rotary drums, extracting-crushers, metal aprons for the conversion or treatment of products, etc., are driven by electric motors which transmit the rotation via numerous step-down gears. The last gear element attached to the member to be rotated is a high-pitch large toothed rim of great width, which is therefore expensive and difficult to machine with precision.

It is an object of the invention to reduce the motive force required while improving the performance of the drive assembly. Other objects of the invention are to simplify manufacture and maintenance, ensure greater reliability and reduce the cost of production.

The invention will be better understood from the following description of a number of embodiments thereof with reference to the drawings, in which FIGURES 1–8 show a first and FIGURES 9–18 a second embodiment of the invention.

FIGURES 5–8 are explanatory views showing the different phases of operation.

FIGURES 12–18 are views explaning the operation of the apparatus.

Figure 1:
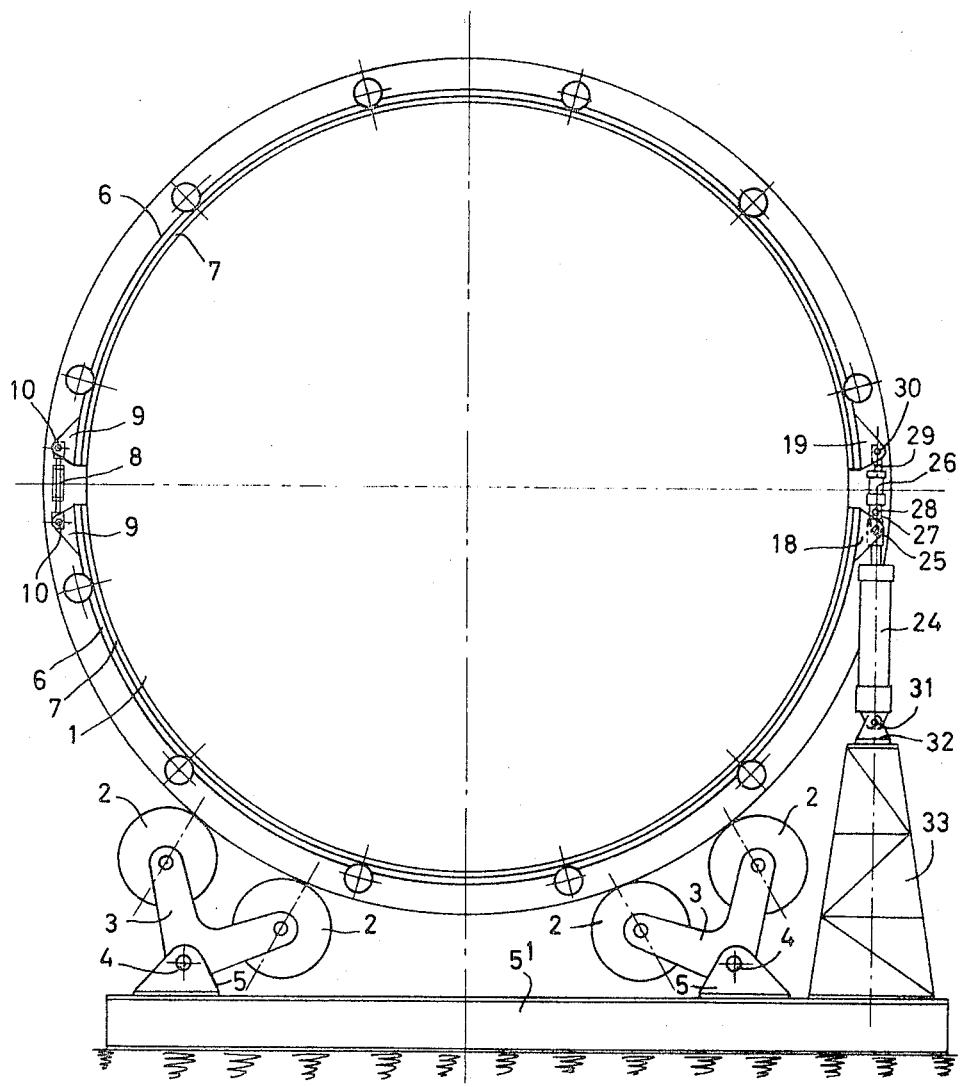
FIGURE 1 is a diagrammatic cross-section through a first embodiment of the apparatus according to the invention.

The drawings show a drum 1 borne on rollers 2 disposed in two pairs, each pair of rollers being connected by a two-armed lever 3 articulated around a pivot 4 borne by a support 5 resting on a base 5¹. The element to be actuated (the drum) is driven either by metal strips 6 lined with friction strips 7 (made, for instance, of Ferodo asbestos), or by the friction of metal strips on friction strips (made, for instance, of Ferodo asbestos) which are coiled and attached to the body of the actuated element (the drum).

In the embodiment illustrated in FIGURES 1–8, each strip is formed by two halves articulated to one another by a screw-tightener 8 which enables any clearance or possible elongation of the strip 7 to be taken up. The screw-tightener 8 is connected to each semi-strip by lugs 9 attached thereto, the screw-tightener 8 being connected to the lugs via pivots 10.

The strip 6 is centered on the drum or like element and supported by spring suspensions (FIGURE 2) which normally keep the strip 6 away from the drum. The strip 6 is therefore suspended from rods extending through shafts having rollers 13, 14; one roller 13 moves directly on the actuated element, while the roller 14 moves on a rail 15 disposed on the actuated element. The rods 11 project beyond the shaft 12 and have springs 16 whose tension can be adjusted by nuts 17.

Figure 4:
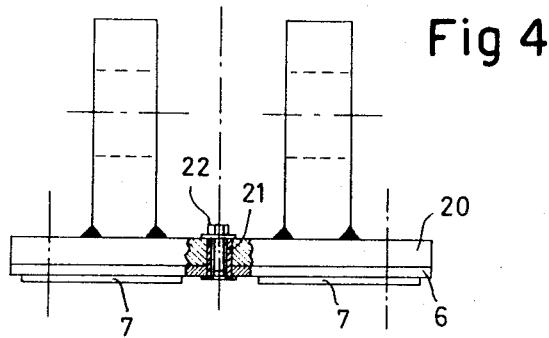

There are attached to those ends of the strip 6 which are remote from the articulation, lugs 18, 19 which can be welded directly to the strip 6 (FIGURE 3) or welded to an attachment 20 (FIGURE 4). The strip 6 is connected to the attachments 20 by bearing-bushes 21 having screws 22. The lug 18 is coupled to the rod 23 of the piston of a driving cylinder 24 via a pivot 25.

Disposed between the lugs 18, 19 is a gripping cylinder 26 (FIGURES 1–5 and 5A) connected to the pivot 25 of the lug 18 by a connecting rod 27 connected to the cylinder 26 by a pivot 28, while the rod 29 of the piston of the cylinder 26 is connected to the lugs 19 by a pivot 30. The bottom end of the cylinder 24 is connected by a pivot 31 to a support 32 attached to a base 33 which receives the reactions of the cylinders.

Figure 2:
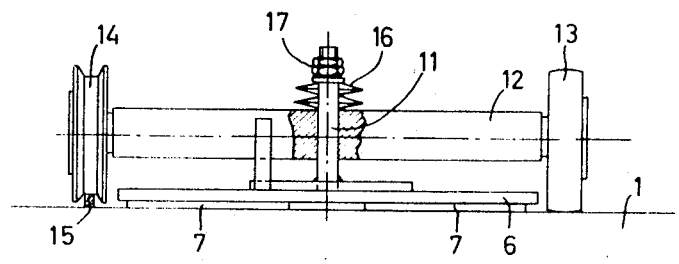
FIGURES 2–4 are views of details.
Figure 3:
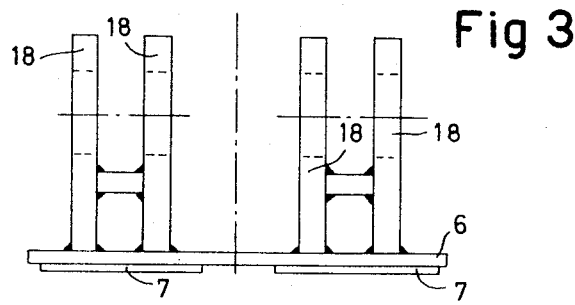

The apparatus operates as follows:

In the position shown in FIGURES 5 and 5A, the strip has just been brought into its starting, open position, i.e., the strip 6 is disengaged from the drum 1. The strip 6 is then applied to the drum 1 (FIGURE 6) by the piston of the gripping cylinder 26 to which pressurised fluid is supplied at a place 26² (26¹ being open). The springs 16 of the suspension rods 11 for the strip 6 are compressed (FIGURE 2). During this operation, the piston of the driving cylinder 24 moves in the driving direction as a result of the introduction of pressurised fluid at a place 24¹ (24² being open). The strip 6 now gripping the element to be actuated (the drum), the piston of the driving cylinder 24 performs its driving stroke, pressure continuing to be applied at the place 24¹ and at the place 26² in the gripping cylinder 26. The tangential force required for rotation is transmitted to the strip 6 by rod 23, shaft 25 and lugs 18. The lugs 18 thus drive the strip which is engaged with the drum, as a result of the frictional coefficient of the friction strips and the gripping force applied. During the movement (the apparatus moves from the position shown in FIGURE 6 to that shown in FIGURE 7), the lugs 18 move concentrically of the axis of the apparatus and pivot the cylinder around the pivot 31 supported by the member 32 resting on the base 33, so that the apparatus is brought into the position shown in FIGURE 7.

At the end of the movement (FIGURE 8) the cylinder 26 is released on the rod side (opening of 26²) and pressure is applied to the other face (at the place 26¹), thus causing the piston rod 29 to emerge and therefore moving the lugs 19 away from the lugs 18.

The strip 6 is therefore disengaged from the drum by the spring suspension devices 16. A device opens the orifice 24¹ in the cylinder 24, sends the pressurised fluid through the orifice 24² and thus returns the strip 6 to the position shown in FIGURES 5 and 5A. At the same time the suspensions 11, 16, 17 (FIGURE 2) connected with the strip 6 are moved over the drum by the rollers 13, 14. The whole cycle is then repeated.

When a continuous rotation of the drum is required, a second driving device identical to that described hereinbefore is synchronised therewith so that the return stroke of the driving piston 24 of the device corresponds to the driving stroke of the driving piston 24 of the second device, and vice-versa.

In addition to the advantages enumerated hereinbefore, the fact that fluid is supplied to the cylinders at variable speed enables the apparatus to operate very flexibly over a range of speeds varying between zero and top speed, while ensuring constant torque.

Referring to FIGURES 9–18, a strip 34 has a friction strip 35. The strip 34 is suspended from rods 36 having springs 37 with one or more adjusting nuts 38 and rollers 39 moving on rails 40 connected with a guide member 41 formed with oblong holes 42 through which rods 36 extend.

The rollers 39, which are mounted freely on stub axles 43 mounted on a block 44, enable the rods 36 to move in the oblong holes 42 together with the strip during its limited movement.

Figure 9:
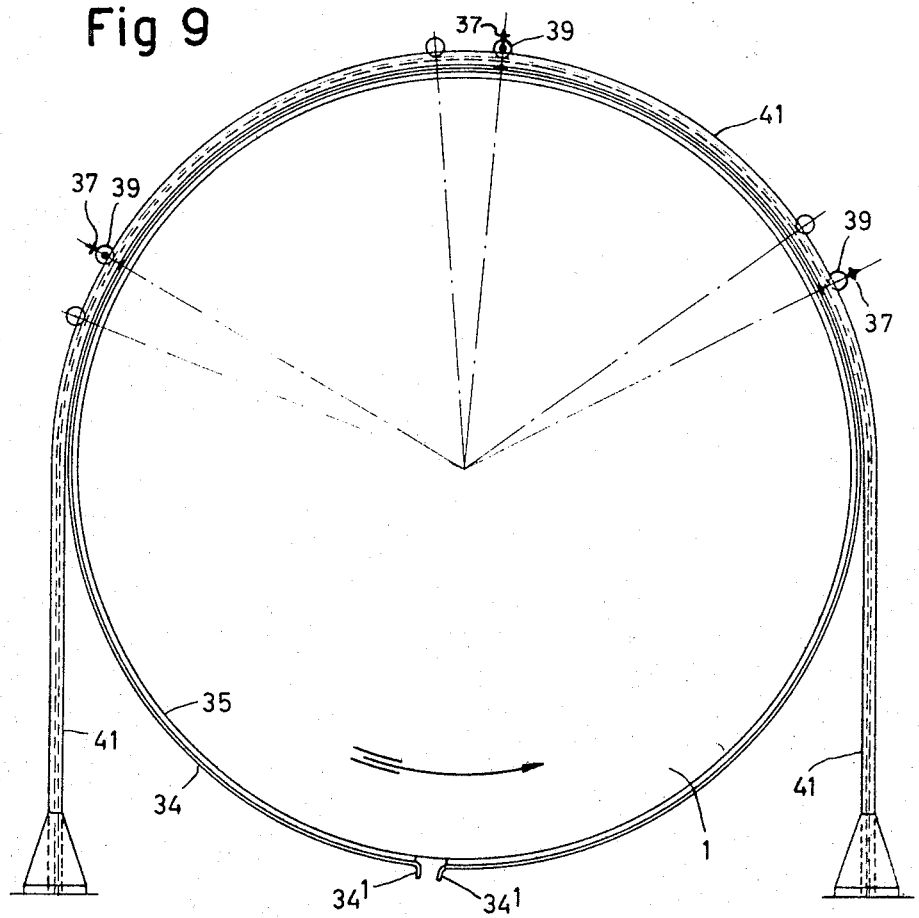
FIGURE 9 is a diagrammatic cross-section through a second embodiment of the apparatus according to the invention.
Figure 10:
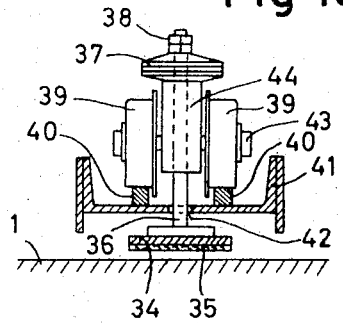
FIGURES 10 and 11 are views of details.
Figure 11:
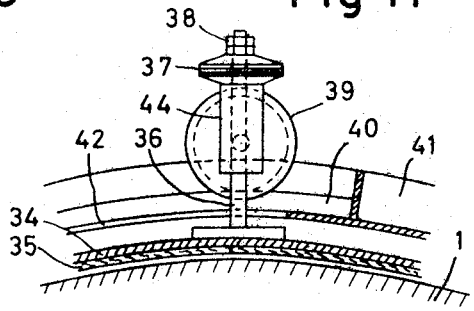

The strip 34, which is in one piece, has its ends outwardly bent down at an angle of 90°, as shown at $34^1$ (FIGURES 9, 12, 14). Said ends bear gripping shoes 45, 46. The shoe 45 (FIGURE 14) is formed with two holes 47, 48, one 47 of which is articulated to a fork 49 connected to the piston rod 50 of a cylinder 51 disposed substantially horizontally and articulated at 52 to a support 53. There extends through the other hole 48 a pin 54 engaging in round holes 55 in a strap 56 connecting the shoes 45, 46 around the outside thereof and also over the folded over portions $34^1$ of the strip 34. The strap 56 is formed with oblong holes 57 in which there engages a pin 58 borne by the shoe 46 formed with a hole 59 for articulation to piston rod 60 of a cylinder 61 disposed substantially horizontally and articulated at 62 to a support 63. The cylinder 61 has a larger diameter than the cylinder 51.

The apparatus operates as follows:

When the strip is brought into the open starting position (FIGURE 12), fluid is introduced into orifice $61^1$ of the cylinder 61 so that the piston 60 moves in the direction indicated by an arrow F1 (FIGURE 12). The pin 58 of the shoe 46 slides in the oblong hole 57 in the strap 56 and entrains the shoe 46 and the strip 34, 35, so that the same grips the drum 1. Now that the strip 34, 35 is gripping the drum (FIGURE 16) the pressure fluid continues to be supplied to the cylinder 61 by the orifice $61^1$, and the same pressure is maintained in the cylinder 51. As a result of the difference in the diameters of the cylinders 51 and 61, the shoes 46 drive the strip 34, 35 which is gripping the drum, as a result of the high frictional coefficient and gripping force.

During their circular movement (arrow F, in FIGURE 17) the shoes 45, 46 move concentrically of the axis of the apparatus and pivot the cylinders 51, 61 on their pivots 52, 62 disposed in fixed supports 53, 63 so that the shoes are brought into the position shown in FIGURE 17.

Meanwhile, the assembly 36–39 (FIGURE 10) moves by the rollers 39 on the rails 40 of the guide member 41, the springs 37 being compressed. The rods 36 move in the oblong holes 42. At the end of the movement, an end-of-run device releases the cylinders 51, 61 and pressure is applied at the place $61^2$ to the other face of the piston of the cylinder 61, so that the pivot 58 is withdrawn in the opposite direction from that indicated by the arrow F1, and the shoe 46 moves away from the shoe 45.

The spring suspension devices 36–38 disengage the strip 34, 35 from the drum, and the shoes thus separated from one another and the strap 56 resume the position shown in FIGURE 12. The complete rotary cycle is then repeated as before.

FIGURE 14 shows a variant of the invention in which the friction material takes the form of continuous shoes or strip portions $7^1$.

In all the embodiments shown, the drum can rotate at a constant or variable speed.

What I claim is:

1. A controlling device for the rotation of a slowly-rotating drum-shaped member comprising, in combination, rollers for movably supporting said drum; metal strip means associated with frictional material for driving said drum-shaped member; gripping means linked to said metal strip for gripping the same; means for applying tangential linear forces to said strip means; piston and cylinder means for applying said tangential linear forces; and fluid means for actuating said piston within said cylinder.

2. The controlling device as defined in claim 1 wherein said frictional material is Ferodo.

3. The controlling device as defined in claim 1 wherein said frictional material is secured to said drum-shaped member, said member being driven by friction prevailing between said metal strip means and said frictional material.

4. The controlling device as defined in claim 1 wherein said metal strip means comprises two metal strips lined with frictional material, the ends of said strips including lug means connected to said piston means, one strip being in driving position corresponding to the driving position of the piston connected thereto while the other strip is in returning position corresponding to the return stroke of its associated piston after having been in the driving position.

5. The controlling device as defined in claim 4 including means for actuating said strips alternately through entry and exit of said fluid in said cylinder means at predetermined time intervals.

6. The controlling device as defined in claim 4 including bearing train means for suspending said strips in relation to said drum-shaped member; spring suspension means in said train means for disengaging said strips from said member, said train means moving together with said member during driving motion in which said member is driven through said strips, said train means being withdrawn and released from said member at the end of said driving motion for starting a new cycle.

7. The controlling device as defined in claim 4 wherein each strip comprises two semi-strips articulated to one another through take-up means, said take-up means comprising screw-tightening means connected to lugs attached to the ends of said semi-strips, and pivot means for connecting said screw-tightening means to said lugs.

8. The controlling device as defined in claim 6 including rods for suspending said strips centered on the drum; shafts through which said rods extend; rollers mounted on said shafts, one roller moving directly on said member, and the other roller moving on a rail disposed on said actuated member, said rods projecting beyond the shaft and having adjustable tension springs.

9. The controlling device as defined in claim 7 including bearing bushings with screws for securing in place the ends of the strips remote from the articulating lugs.

10. The controlling device as defined in claim 9 including a first pivot for coupling one of the lugs to a piston of a driving cylinder; a gripping cylinder disposed between the lugs and connected to said pivot, said lugs being disposed on said driving cylinder through a connecting rod associated with the piston of the gripping cylinder and a second pivot, the rod of the piston of the gripping cylinder being connected through a third pivot to the lugs opposite to the aforementioned lugs.

11. The controlling device as defined in claim 10 including a fourth pivot for connecting the bottom end of the driving cylinder to a support attached to a base receiving the reactions of the cylinders.

12. The controlling device as defined in claim 1 wherein said strip means is a one-piece strip with ends outwardly bent over an angle of 90 degrees and bearing gripping shoes having two holes, one of said holes being articulated with a fork integral with the piston rod of a cylinder disposed substantially horizontally and articulated at its other end to a support, a shoe pin extending through the other hole and engaging in round holes in a strap connecting the shoes by extending along the outside of the shoes and the bent-over portions of said strip, said strap having oblong holes engaging another pin carried by the shoe with a hole for articulation to the piston of another cylinder disposed substantially horizontally and articulated to another support.

13. The controlling device as defined in claim 12 including rods for suspending said strip, said rods having springs and rollers moving on rails integral with a guide member having oblong holes through which said rods extend, said rollers being freely mounted on stub axles and enabling said rods to move in said oblong holes together with the strip during limited movement thereof.

References Cited

UNITED STATES PATENTS 3,043,019   7/1962   Steimel _____ 263—32

FOREIGN PATENTS 626,819   9/1961   Canada.

FRED C. MATTERN, Jr., Primary Examiner

F. D. SHOEMAKER, Assistant Examiner

U.S. Cl. X.R.

74—126; 263—32